United States Patent [19]
Copeland

[11] 3,910,528
[45] Oct. 7, 1975

[54] FREE SPOOL MECHANISM

[75] Inventor: Gregory D. Copeland, Fayetteville, Ark.

[73] Assignee: Shakespeare of Arkansas, Inc., Fayetteville, Ark.

[22] Filed: Sept. 14, 1973

[21] Appl. No.: 397,285

[52] U.S. Cl.................. 242/216; 192/93 R; 242/220
[51] Int. Cl.² ........................................ A01K 89/02
[58] Field of Search .......... 242/216, 217, 218, 219, 242/220, 211, 213, 212, 214, 215, 221; 192/93 R

[56] References Cited
UNITED STATES PATENTS

| | | | |
|---|---|---|---|
| 2,129,386 | 9/1938 | Schafer | 242/216 X |
| 2,354,530 | 7/1944 | McMahon | 242/216 |
| 3,051,409 | 8/1962 | Sarah | 242/220 |
| 3,104,850 | 9/1963 | Wood | 242/221 X |
| 3,489,366 | 1/1970 | Rankin, Jr. | 242/200 |

*Primary Examiner*—Billy S. Taylor
*Attorney, Agent, or Firm*—Hamilton, Renner & Kenner

[57] ABSTRACT

A free spool mechanism for a reel of the bait casting type. The drive train between the crank and the line spool comprises at least a drive gear and a pinion gear, the teeth of which remain continually in mesh. The pinion is adapted to be axially translated, and a clutch between the pinion and the line spool is selectively engaged and disengaged upon axial translation of the pinion. Axial translation of the pinion is effected by a shift member that simultaneously translates and swings. Tynes on the shift member continually engage the pinion and shift it axially in response to movement of the shift member in order to engage and disengage the clutch. Upon the application of generally radially directed force to the knob that is presented by the shift member exteriorly of the reel, the pinion is translated to disengage the clutch means, and a spring which is positioned between the frame and the shift member biases the latter to translate the pinion in the opposite direction to engage the clutch. A latch on the frame maintains the pinion with the clutch disengaged until the crank is turned to retrieve line at which time a throw incorporated in the pinion releases the latch.

9 Claims, 8 Drawing Figures

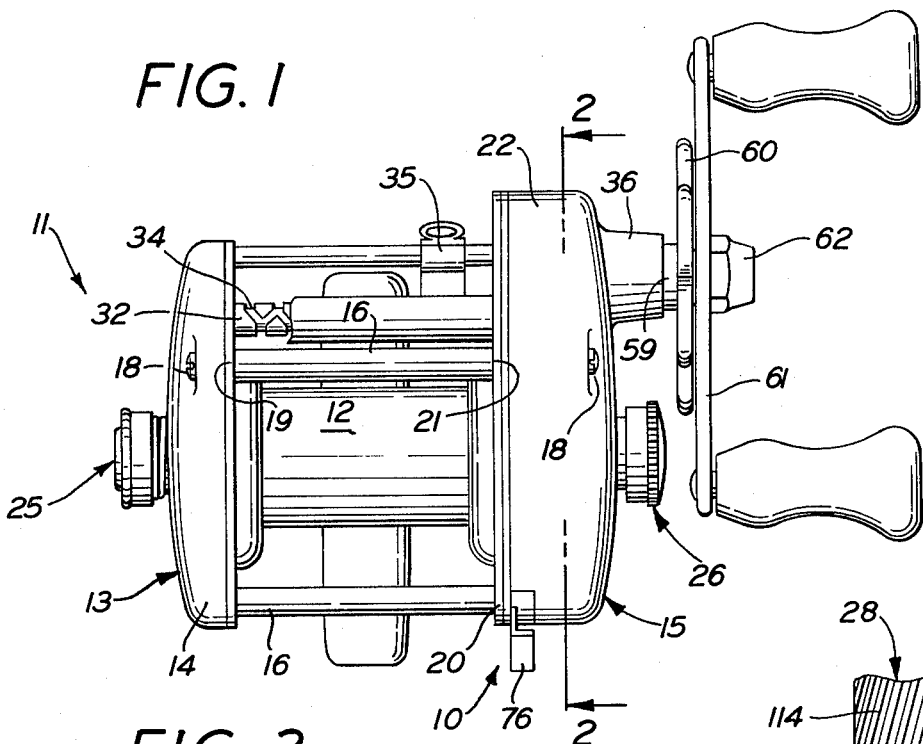
FIG. 1
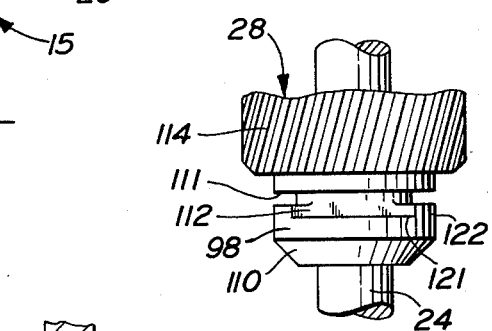
FIG. 8
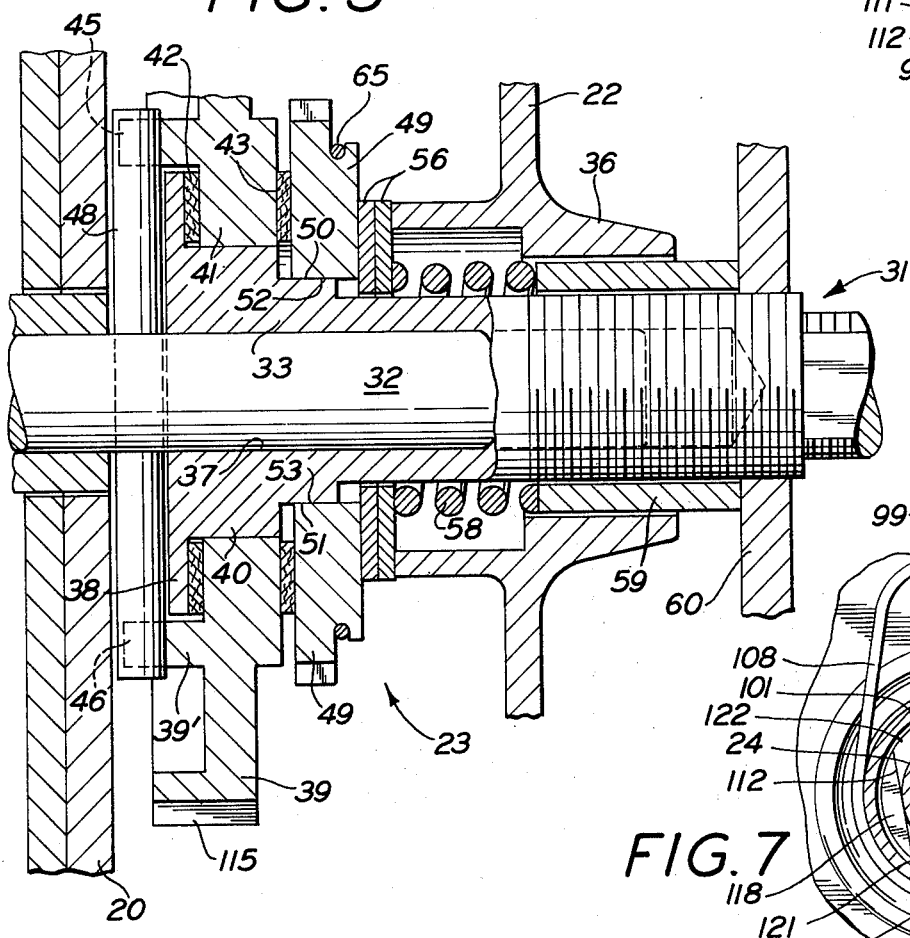
FIG. 3
FIG. 7

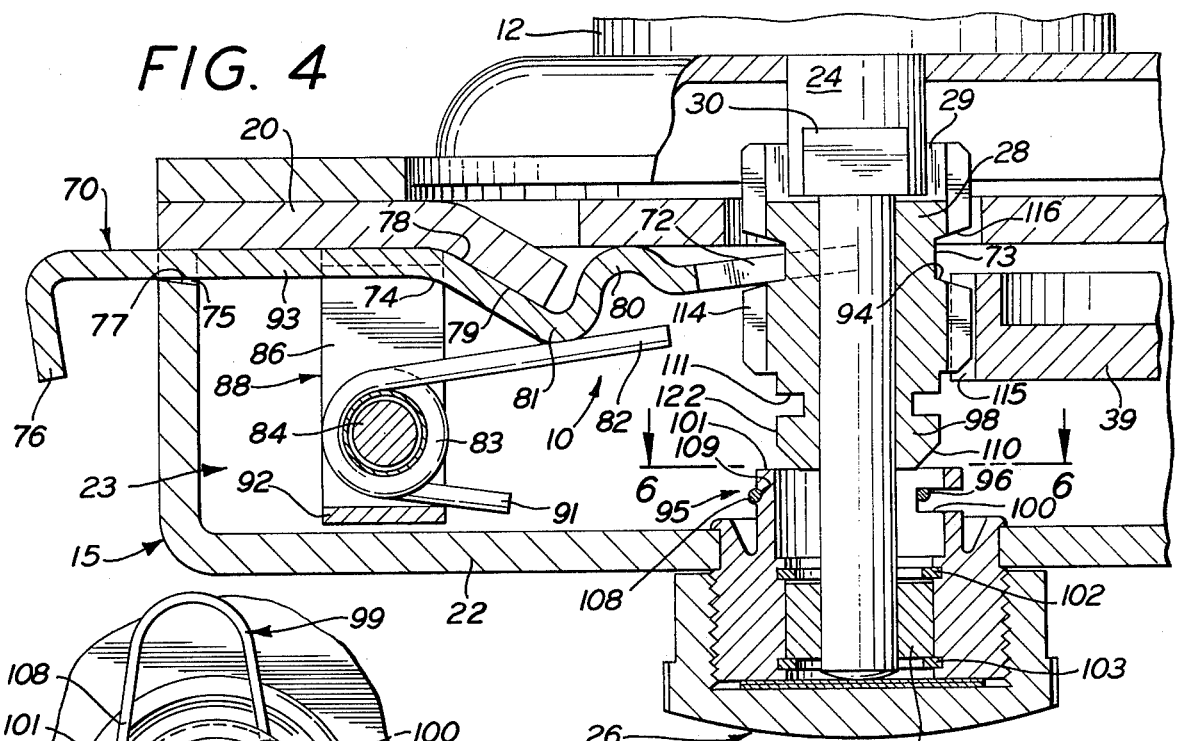
FIG. 4
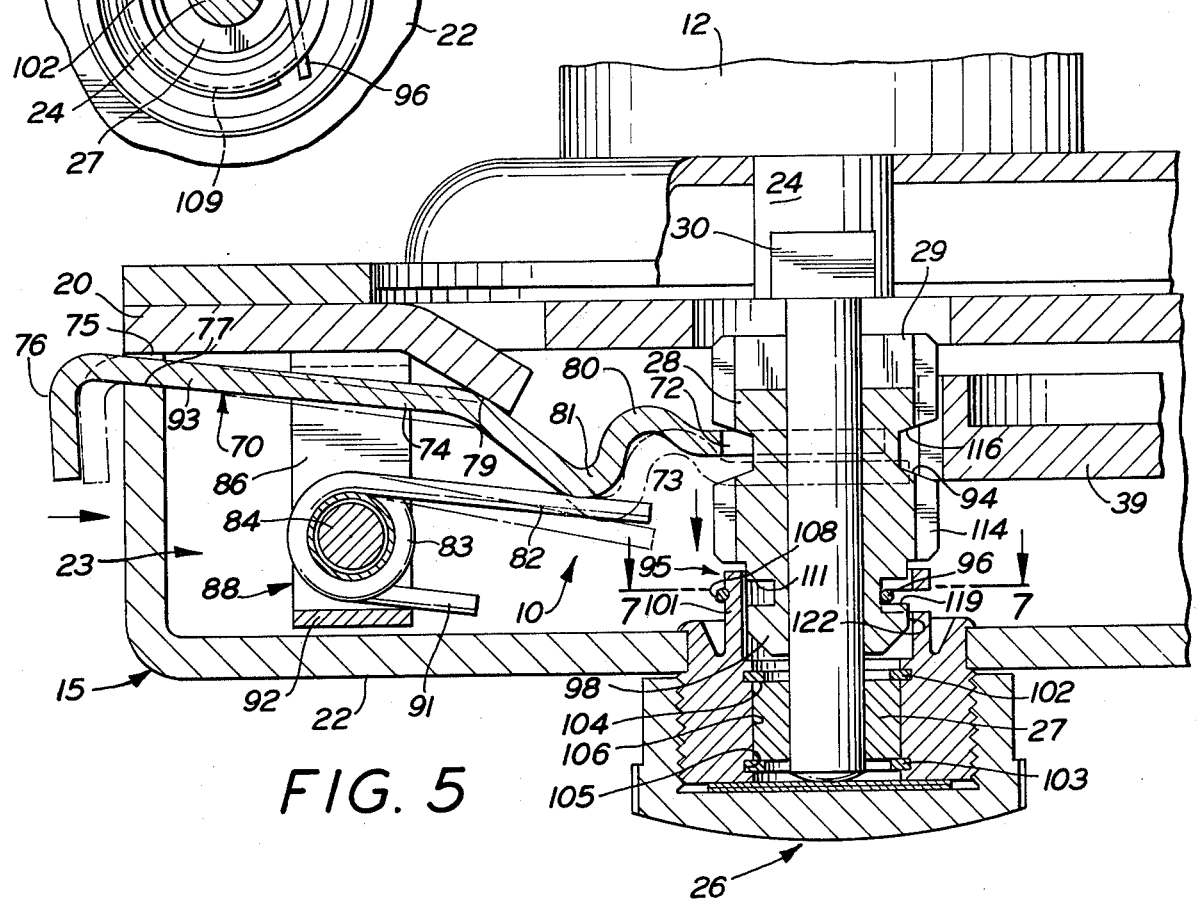
FIG. 6
FIG. 5

FREE SPOOL MECHANISM

BACKGROUND OF THE INVENTION

The present invention relates to a free spool mechanism.

It was recognized at a very early stage in the development of bait casting reels, and particularly multiplying reels, that there were many advantages to be obtained by permitting the spool to rotate independently not only with respect to the crank but also with respect to as much of the drive train between the crank and line spool as possible. Absent this free spooling, the intertooth friction between meshing gear teeth in a complex drive train will itself tend to retard rotation of the line spool during the cast, and this undesirable effect is often augmented by the improper application of heavy grease to the gear teeth. But an even greater hindrance to the achievement of controlled rotation by the line spool during the cast is a result of inertia — both static and dynamic.

The principle of bait casting is that the lure, the motion of which is imparted by the action of the rod, pulls the line from the reel, causing the spool on which the line is wound to revolve. The spool must start to revolve suddenly from a dead stop at the beginning of the cast, must pay out line in ratio to the pull of the lure as it travels through the air and must be made to cease revolving as soon as the lure reaches its destination.

As such, the greater the mass that must be put into motion by the cast, the greater the resistance that is offered against the flight of the lure. Similarly, once this mass is put into motion, the more difficult it is to slow the movement thereof in coordination with the flight of the lure at the end of the cast. The use of a free spool mechanism permits reduction of the mass that must be put in motion and then stopped.

Historically, free spool arrangements required manual actuation of means to disengage the spool from the drive train prior to the cast and then additional manual actuation upon completion of the cast to re-engage the line spool with the drive train before rotating the crank. As the free spool concept was further developed, various mechanisms were devised for disengaging the line spool from the drive train and then automatically re-engaging the line spool with the drive train upon initial rotation of the crank to retrieve the line.

Heretofore, one of the simplest arrangements employed opposed clutch elements selectively to interconnect the line spool with a pinion in the drive train operatively connecting the crank to the line spool. One of the clutch elements was mounted on the pinion and the other on the line spool. The pinion was rotatable to drive the line spool and axially translatable to engage and disengage the elements of the clutch. That prior known arrangement employed a spring means continuously to bias the pinion in a direction to maintain the clutch elements engaged. Specifically, the spring was interposed between the frame of the reel and the pinion itself. A slide plate, movable between first and second positions, was cooperatively connected to the clutch operating lever so that movement of the slide plate from the first to the second position by a fisherman's finger selectively disengaged the clutch elements and retained them disengaged until a tooth-like cam, or cams, operative in response to rotation of the crank to retrieve line, contacted the slide plate and moved it from the second position back to the first position at which time the spring effected re-engagement of the clutch.

While effective, the continual application of biasing contact between the spring and pinion increases the potential necessity for undue maintenance and repair. The continued application of spring pressure against the pinion has also been found to have a tendency to reduce the free rotation of the spool by cocking the pinion against the spool shaft or by itself engaging the spool shaft, even while the pinion was being maintained in the free spool position.

Moreover, with the prior art configuration described above, the pinion can be inadvertently released from its free spooling position by a modest shock transmitted to the frame of the reel.

SUMMARY OF THE INVENTION

It is, therefore, a primary object of the present invention to provide a novel free spool mechanism utilizing a clutch means that is automatically re-engaged by the initial retrieving movement of the crank and yet is exceedingly uncomplicated so that it can be incorporated in a fishing reel with a minimal number of parts.

It is another object of the present invention to provide a free spool mechanism, as above, in which the means for automatically re-engaging the clutch means will not block manual disengagement thereof, is relatively inexpensive to manufacture and maintain, and will provide a long life even under arduous use.

It is a further object of the present invention to provide a free spool mechanism, as above, that employs a shift member which can be located for facile actuation by the thumb on the fisherman's hand holding the rod, the biasing action to maintain the clutch elements engaged being applied through this shift member which will not apply frictional resistance against free rotation of the pinion after the clutch elements are engaged nor impart any frictional resistance to the free rotation of the spool shaft while the clutch elements are disengaged.

These and other objects, together with the advantages thereof over existing and prior art forms which will become apparent from the following specification, are accomplished by means hereinafter described and claimed.

In general, a free spool mechanism embodying the concept of the present invention is employed with a bait casting reel having a frame. A line spool is rotatably mounted in the frame and is operatively interconnected to a crank by virtue of a drive train comprised of multiple, rotatable members.

The drive train includes at least a drive gear and a pinion that are in continuous, meshing engagement. A first clutch element is presented from one axial end of the pinion for selective engagement with a second clutch element presented from the line spool. The pinion is axially translatable by a shift member to effect engagement and disengagement of the clutch elements.

The shift member has a knob means exteriorly of the reel frame for actuation by the fisherman's finger and engaging means interiorly of the reel frame for contacting the pinion. A biasing means is operatively positioned between the frame and the shift member freely to maintain the pinion positioned with the clutch elements engaged but yieldingly to resist translation of the pinion so as to disengage the clutch elements.

A ramp is provided on the reel frame for engagement by a follower surface on the shift member so that as pressure is applied radially inwardly to the knob and of sufficient magnitude to overcome the biasing pressure of the spring means, the shift member will move radially inwardly and simultaneously swing so as to effect axial translation of the pinion and thereby disengage the clutch elements.

When the pinion is translated to disengage the clutch elements a latch mechanism on the reel frame grasps the second end of the pinion to retain the pinion in its axially outer position.

A throw is provided on the pinion which releases the latch mechanism upon rotation of the pinion in response to the initial turning of the crank to retrieve line. Releasing the latch allows the spring means to translate the pinion in a direction to effect a reengagement of the clutch elements.

One preferred embodiment of the subject free spool mechanism is shown by way of example in the accompanying drawings without attempting to show all of the various forms and modifications in which the invention might be embodied; the invention being measured by the appended claims and not by the details of the specification.

DESCRIPTION OF THE DRAWINGS

FIG. 1 is a top plan view of a bait casting reel embodying the concept of the present invention;

FIG. 3 is a further enlarged cross section taken substantially along line 3—3 of FIG. 2 and appearing on the same sheet of drawings as FIG. 1, said FIG. 3 depicting not only the interrelation of the drive and traversing shafts to form the combination shaft but also the various other components of the bait casting reel mounted on, or about, the drive shaft;

FIG. 4 is a further enlarged cross section taken substantially along line 4—4 of FIG. 2 and depicting the components comprising the free spool mechanism, said components being disposed to effect a driving connection between the crank and the line spool;

FIG. 5 is a view similar to FIG. 4 but depicting the components disposed to permit free spooling;

FIG. 6 is an enlarged section taken substantially along line 6—6 of FIG. 4 and depicting the latch arrangement for retaining the pinion of the free spool mechanism, and the clutch element carried thereon, in the free spooling position;

FIG. 7 appears on the same sheet of drawings as FIGS. 1 and 3 and is a cross section similar to FIG. 6 but taken substantially along line 7—7 of FIG. 5 and enlarged to depict the latch bar received against the cord flats adjacent the annular groove in the pinion; and, FIG. 8 is a side elevation of the pinion slidably carried on the spool shaft and depicting the groove in which the latch bar is receivable as well as a cord flat and releasing throw, FIG. 8 appearing on the same sheet of drawings as FIGS. 1, 3 and 7.

DESCRIPTION OF THE PREFERRED EMBODIMENT

Figure 2:
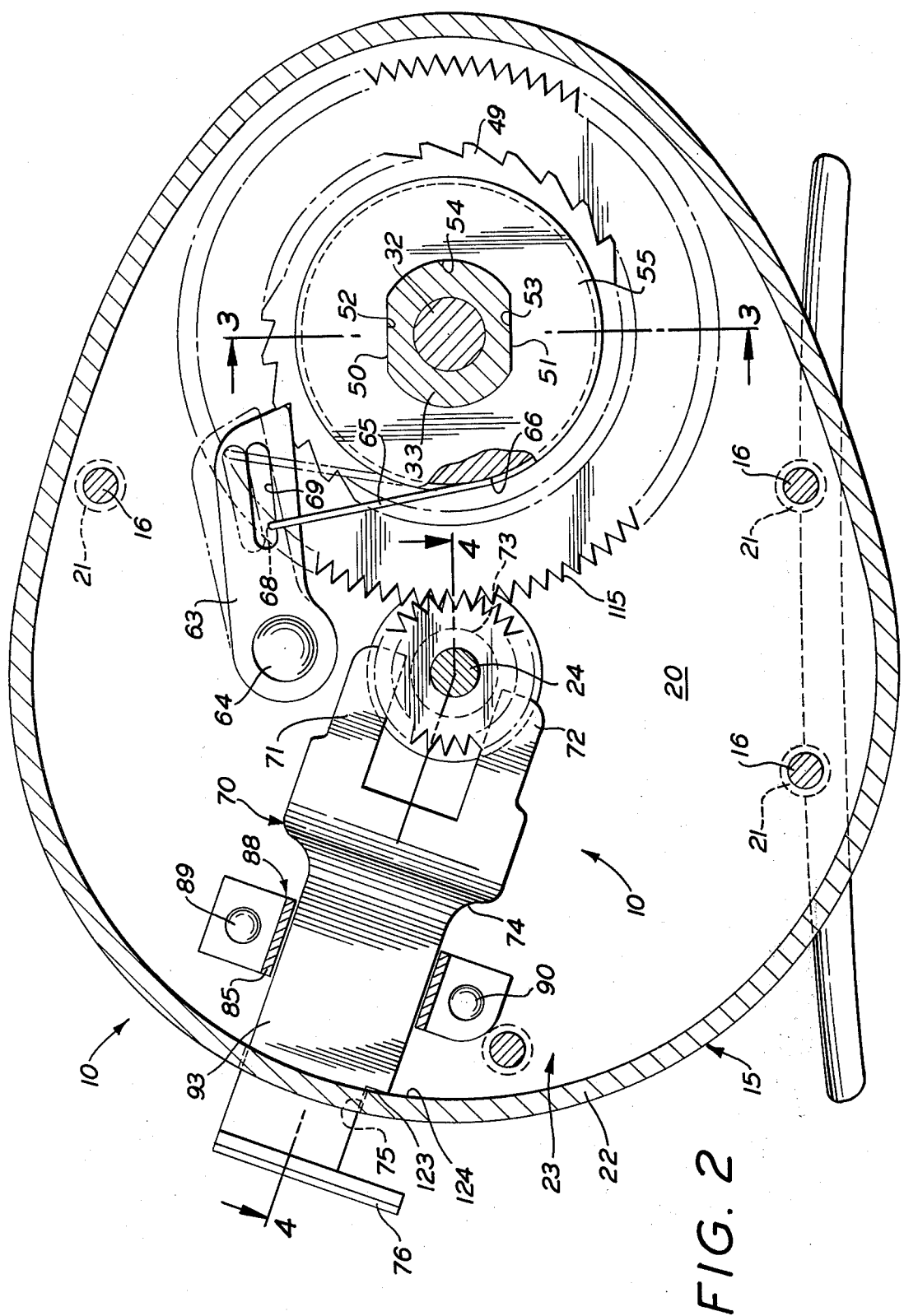
FIG. 2 is an enlarged cross section through the gear chamber of the bait casting reel and taken substantially along line 2—2 of FIG. 1.

The improved free spool mechanism embodying the concept of the present invention is designated generally by the numeral 10 on the attached drawings and is depicted as it would be incorporated in a reel 11 of the bait casting variety.

The reel 11 has a line spool 12 rotatably mounted in reel frame 13 comprising a tail plate assembly 14 joined in spaced relation to a head portion 15 by a plurality of stepped pillars 16 each end of each being adapted to receive a cap screw 18. The tail plate 14 is secured between the stepped shoulders 19 at one end of each pillar 16 and the cap screws 18 anchored in that end of the pillar 16.

The head portion comprises a head plate 20 receivable against the stepped shoulders 21 presented near the opposite end of the pillar 16 and a head cap 22 that is detachably secured to the remainder of the reel frame 13 by similar cap screws 18. The head plate 20 and head cap 22 encompass an interior cavity serving as a gear chamber 23 (FIG. 2).

The line spool 12 is secured to a spool shaft 24 (FIGS. 4 and 5) so as to be rotatable therewith and the shaft 24 is supportingly journaled by the reel frame 13 — one end in a bearing assembly 25 (FIG. 1) mounted in the tail plate assembly 14 and the other end in a bearing assembly 26 mounted in the head cap 22.

A free spool pinion 28 is mounted on the spool shaft 24 within the gear chamber 23 and presents an axially directed clutch element 29 meshingly interengageable with a mating clutch element 30 anchored to the spool 12 and spool shaft 24. Although a variety of configurations may be employed as the clutch elements, the interfitting flat 30 on spool shaft 24 and the slot 29 in pinion 28 depicted will operate quite satisfactorily.

Laterally spaced from the line spool 12 and spool shaft 24 is a combination shaft 31 comprised of axially aligned traversing and drive shafts 32 and 33. The traversing shaft 32 is journaled between the tail plate assembly 14 and the head plate 20. Between the tail plate assembly 14 and the head plate 20 the traversing shaft 32 presents a traversing portion provided with the customary crossover threads 34 to reciprocate a level wind 35.

Within the gear chamber 23 the drive shaft 33, which is journaled through a boss 36 in the head cap 22, cooperatively engages the traversing shaft 32. The drive shaft 33 presents a longitudinal bore 37 from its axially inner end into which that portion of the traversing shaft 32 within the gear chamber 23 is rotatably received.

The axially inner end portion of the drive shaft 33 presents a foot disc 38 that extends radially outwardly therefrom. An input drive gear 39 is supported on an enlarged cylindrical portion 40 of the drive shaft 33 adjacent the foot disc 38, and the nave portion 41 of the drive gear 39 is embraced between two friction washers 42 and 43 so as to be both rotatable and axially slidable with respect to the drive shaft 33.

An annular flange 39' located radially outwardly of the nave portion 41 extends axially outwardly from the drive gear 39 beyond the foot disc 38. A pair of diametric slots 45 and 46 in the flange 39' are engaged by a pin 48 that extends through, and transversely outwardly from, the traversing shaft 32 so that any time the drive gear 39 rotates, the traversing shaft will rotate in unison therewith.

An anti-reverse ratchet 49 is supported on the enlarged cylindrical portion 40 of the drive shaft 33 so as to be slidable axially thereof and yet be rotatable only therewith. This result may be accomplished by providing opposed flats 50 and 51 (FIGS. 2 and 3) on the enlarged cylindrical portion 40 of the drive shaft 33 which are slidably engaged by corresponding cord walls 52 and 53 in the mounting aperture 54 of the ratchet 49.

The hub portion 55 of the ratchet 49 extends axially outwardly beyond the enlarged cylindrical portion 40 of the drive shaft 33 (as best seen in FIG. 3) to facilitate control of the axial movement by the drive shaft 33 with respect to the components supported thereon. To effect control in the movement of the drive shaft 33 with respect to those components, one or more preferably metallic washers 56 are received over the drive shaft 33 to engage the axially outer surface of the hub portion 55 on the ratchet 49. The washer(s) 56 is (are) in turn engaged by the axially inner end of a compression spring 58 which freely circumscribes the drive shaft 33. The axially outer end of the spring 58 is engaged by a gland in the form of a sleeve 59 that is also supported on the drive shaft 33 so as to be slidable axially thereof. Sleeve 59 also serves as a bearing within the boss 36 in the head cap 22 and extends axially outwardly beyond the boss 36 for contact with an adjusting means in the form of a star wheel 60, or the like, threadably mounted on the drive shaft 33. Axially outwardly of the star wheel 60 a crank 61 is demountably secured to a portion of the drive shaft 33 having a reduced diameter in the customary fashion for rotation therewith and is retained thereon by a decorative cap nut 62.

It should be appreciated that by having the drive shaft 33 movable axially of the components mounted thereon without destroying the driving interconnection between the drive gear 39 and the traversing shaft 32, rotation of the star wheel 60 against the sleeve 59 will tend to compress the components mounted on the drive shaft 33 against the foot disc 38. Variation of this compressive loading varies the degree of frictional engagement between the washers 42 and 43 and the nave portion 41 of the drive gear embraced therebetween for adjustment of the drag.

As can be seen in FIG. 2, a pawl 63 is mounted to swing on a stud 64 extending into the gear chamber 23 from the head plate 20. A spring wire 65 embraces an annular notch 66 in the hub portion 55 of the ratchet 49, and a hook 68 on one end of the spring wire 65 engages a slot 69 in the pawl 63. As such, the crank 61 can be turned to retrieve line (the pawl 63 being disposed in the chain line position), but the crank is precluded from reverse rotation because such rotation will cause the pawl 63 to engage the ratchet (the solid line representation).

Turning now to the free spool mechanism 10, a shift means is provided selectively to disengage the clutch elements 29 and 30. As best shown in FIGS. 2, 4 and 5, the shift means may comprise a shift member 70 having a pair of spaced tynes 71 and 72 within the gear chamber 23 that continuously engage an annular recess 73 located medially the axial extent of the pinion 28. The tynes 71 and 72 are presented from the shank portion 74 of the shift member 70, and the shank extends across a portion of the chamber 23 and outwardly through an aperture 75 at the juncture of the head cap 22 and head plate 20. The shank portion 74 terminates in a thumb knob 76 located exteriorly of the reel frame 11.

The shank portion 74 of the shift member 70 has a follower 78 that engages a cam 79 which may comprise an inclined lip, or ramp struck from the head plate 20 to extend inwardly of the gear chamber 23. Between the follower 78 and the tynes 71 and 72 the shank portion 74 preferably follows an S-shaped configuration, when viewed in side elevation, so that one loop 80 of the "S" will engage the head plate 20 to arrest the action of the hereinafter described spring 83 when the shift member is in the first, or deactivated position represented in FIG. 4 — i.e., when a driving connection exists between the crank and line spool. The second loop 81 of the "S" is engaged by a resilient means that continuously biases the shift member 70 toward its deactivated position. Such a resilient means may comprise one leg 82 of a coil spring 83 that is mounted on a supporting shaft 84 which extends between the opposed legs 85 and 86 of a stanchion 88 secured to the head plate 20, as by rivets 89 and 90. The second leg 91 of the spring 83 may well be anchored against the cross member 92 at the upper extent of the stanchion 88.

The legs 85 and 86 of the stanchion 88 may also serve as lateral guides for the straight sided segment 93 of the shank portion 74 extending from the follower 78 toward the thumb knob 76.

The application of pressure to the thumb knob 76 causes the follower 78 to be displaced along the inclination of the cam 79 against the biasing pressure applied by leg 82 of spring 83. The resulting compound motion imparted to the shift member — which translates radially inwardly as one component of motion and simultaneously rotates about the pivot point defined by the aperture 75 as the second component of motion (note the inclination 77 in the laterally outer side of the aperture to accommodate this motion) to bring the tynes 71 and 72 into engagement with the wall 94 along the axially outer side of the recess 73 and thereupon slide the pinion 28 axially outwardly along the spool shaft 24 to disengage the clutch elements 29 and 30. The component of rotation is, therefore, in a plane which includes the axis along which the pinion 28 is translated — i.e., the axis defined by the spool shaft 24.

A latch mechanism 95 is provided to maintain the clutch elements disengaged against the biasing action of the spring leg 82, which biasing pressure is applied to the pinion 28 through the shifting element 70, when the shift member is moved to its activated, or second, position. The latch mechanism 95 also includes a throw adapted to release the pinion 28 upon rotation of the crank 61 so that the clutch elements 29 and 30 will reengage by virtue of the biasing pressure applied by spring leg 82 to the shift member 70.

The latch mechanism 95 employs a latch bar 96 adapted resiliently to engage behind a head 98 presented from the axially outer end of the pinion 28. The latch bar 96 may well comprise one leg of a spring 99 that extends through a notch 100 in the hood 101 carried on the head cap 22. As best shown in FIGS. 4 and 5 the bearing assembly 26 in which the spool shaft 24 is journaled is in the form of a bushing 27 that is secured within the hood 101 by a pair of axially spaced C-rings 102 and 103 received within axially spaced, annular notches 104 and 105 on the inner cylindrical wall 106 of the hood 101. The hood 101 extends axially inwardly of the bushing 27 and is positioned concentrically of the spool shaft 24 so that the head 98 on the pinion 28 will be inserted fully within the hood as the pinion is translated axially to disengage the clutch elements 29 and 30.

The spring 99 has a positioning leg 108 which opposes the latch bar portion 96, and at least a portion thereof is curvilinear such that it can be received within an annular groove 109 on the exterior of the hood 101. The notch 100 preferably extends through the hood 101 within the plane defined by the groove 109.

The axially outer end of the head 98 is preferably tapered, as at 110, to facilitate displacement of the latch bar 96 as the head 98 moves axially outwardly therepast. When the clutch elements 29 and 30 are operatively disengaged, the head 98 is fully received within the hood 101 and the latch bar 96 is received within an annular groove, or detent means, 111 that defines the rear of the head to preclude withdrawl thereof and thereby maintain the clutch elements 29 and 30 disengaged so that the spool 12 and spool shaft 24 are free to rotate without turning the crank 61 or the other components comprising the gear train between the crank and the conjoined spool 12 and spool shaft 24 when a cast is made to pay out line.

The latch mechanism 95 also incorporates a throw operative when the crank 61 is turned to retrieve the line in order to effect a release of the head 98 so that the clutch elements 29 and 30 will re-engage in response to the biasing action of the spring means against the shift member 70.

Specifically, the release is effected by employing at least one releasing throw cam although, as shown in FIGS. 7 and 8, two releasing throw cams are preferably provided in diametrically opposed sides of the head 98. The cams comprise flatted cord surfaces 112 and 113 of the same depth as the annular groove 111 but which extend axially outwardly into the head a distance such that the axial extent of each flatted cord surface 112 and 113 is preferably equal to at least the dimension of the latch 96 measured along the axis of the pinion.

In operation, if the latch bar 96 is received within the groove 111 between the flatted surfaces 112 and 113, when the crank 61 is rotated to retrieve line the drive gear 39 will, assuming that the resistance does not exceed the drag setting, rotate the pinion 28 with which it is meshingly engaged. To assure that the meshing engagement is retained irrespective of whether or not the clutch elements 29 and 30 are engaged, the axial extend of the spiral teeth 114 on pinion 28 must be sufficient to maintain engagement with the spiral teeth 115 on the drive gear 39 throughout the full axial displacement of the pinion 28 accomplished by the action of the shift member 70. Similarly, the axial extent of the annular recess 73 in which the tynes 71 and 72 are received must not be of an axial extent greater than the axial extent of the teeth 115 on the drive gear if, as in the embodiment depicted, the recess 73 will move past the teeth 115 as the pinion 28 is translated to effect engagement and disengagement of the clutch elements 29 and 30.

Returning now to the operation of the release, and assuming that the latch bar 96 has engaged the annular groove 111, rotation of the pinion 28 will bring one or the other of the flatted, cord surfaces 112 or 113 into axial registery with the latch bar 96 (as shown in FIGS. 5 and 7), and the engagement of the tynes 71 and 72 with the axially innermost wall 116 of the annular recess 73 will, under the influence of the biasing pressure applied by the coil spring 83, move the pinion 28 axially inwardly to bring the latch bar 96 against the shoulder 118 or 119 defining the axially outermost extent of the flatted cord surfaces 112 or 113, respectively.

Continued rotation of the pinion 28 causes the intersection 120 or 121 of the flatted surface 112 or 113, respectively, with the cylindrical portion 122 on the outer surface of head 98 to cam, or throw, the latch bar 96 radially outwardly such that the spring 83, acting through the shift member 70, will slide the head 98 axially inwardly past the latch bar 96 to reengage the clutch elements 29 and 30.

By thus sequentially staging the release, the latch bar 96 will be able selectively to retain the head 98 irrespective of whether the pinion 28 is aligned such that the latch bar 96 will initially engage the annular groove 111 or the flatted cord surface 112 or 113. In either event, when the crank 61 is rotated to retrieve the line the clutch elements will be automatically re-engaged, at which time the loop 80 on the shift member 70 will engage the head plate 20 and provide a stop against the biasing action of spring 83, thus relieving the pressure applied by the tynes 71 and 72 against the wall 116 of the annular recess 73 and allowing the pinion to float through a limited axial range to obviate extraneous cranking loads. The annular recess 73 should also be of sufficient axial dimension that the tynes do not otherwise engage the pinion 28 in this position in order to obviate any undesirable frictional contact therebetween. As shown, the walls 94 and 116 may flare to preclude more than minimal contact with the tynes. Nevertheless, the tynes 71 and 72 are retained within the annular recess 73 so that the clutch elements 29 and 30 cannot become inadvertently disengaged.

In order to establish a precise relocation of the shift member 70 in its deactivated position, the straight segment 93 in the shaft portion 74 of the shift member 70 may present a shoulder 123 to engage the inner surface 124 of the head cap 22 when the shift member 70 is returned to its radially outermost position.

Accordingly, a free spool mechanism embodying the concept of the present invention is economical to manufacture and maintain; does not require the application of spring pressure between rotating parts which could result in increased drag and wear; provides for automatic re-engagement of the clutch elements upon the initial retrieval movement of the crank handle; and, otherwise accomplishes the objects of the invention.

I claim:

1. A free spool mechanism for a fishing reel having a frame, a line spool and a crank rotatably mounted on the frame, motion transmitting means interconnecting the crank and line spool, the crank, motion transmitting means and line spool comprising a drive train of multiple rotatable members, a clutch means interconnecting at least two of said rotatable members, one of said rotatable members being axially translatable selectively to engage and disengage said clutch means, a shift mechanism to effect translation of said one rotatable member, said shift mechanism comprising a shift member movable between a first and a second position, a spring means continually engaging said shift member to bias said shift member toward said first position, said shift member engaging said frame to arrest the biasing action of said spring means and permit rotation of said one rotatable member free from biasing contact with said shift member and the affect of said spring means when said shift member is in said first position, an aperture in said frame through which said shift member extends, a knob means on said shift member exteriorly of said frame to receive the application of a radial force, a follower and an engaging means on said shift member interiorly of said frame, said engaging means actuating the translatable member of said drive train, a ramp on said frame engaged by said follower, the application of radially inwardly directed pressure to said knob means when said shift member is in the first position slides said follower along said ramp and effects compound movement of the shift member and the engaging means thereon to translate said rotatable member and disengage said clutch means when said shift member has been moved to the second position.

2. A free spool mechanism, as set forth in claim 1, in which said compound movement is comprised of a component of generally radial translation and a component of rotation about a pivot defined by said aperture in the frame through which the shift member extends.

3. A free spool mechanism, as set forth in claim 2, in which said rotation is in a plane including the axis along which said rotatable member is translated.

4. A free spool mechanism, as set forth in claim 1, in which the rotatable member adapted for translation has an annular recess and in which a pair of tynes on said shift member engage said annular recess, the configuration of said annular recess being such that the tynes permit friction free rotation of the rotatable member while said shift member is in the first position.

5. A free spool mechanism, as set forth in claim 1, in which a portion of the shift member within said frame has an S-shaped configuration to present oppositely directed loops, one of said loops being continuously engaged by said spring means and the second of said loops engaging the frame when said shift member is in the first position to arrest the biasing action of said spring means.

6. A free spool mechanism, as set forth in claim 5, in which said shift member has a straight sided shank portion between the S-shaped configuration and said knob means, a stanchion secured to said frame and embracing said shank portion to serve as a guide, said spring means being mounted on said stanchion.

7. A free spool mechanism, as set forth in claim 5, in which said S-shaped configuration is disposed between said follower and said tynes.

8. A free spool mechanism, as set forth in claim 6, in which a shoulder is presented from said shank portion to engage the frame when said shift member is in its first position.

9. A free spool mechanism for a fishing reel having a frame including a head plate and a tail plate, a line spool rotatably mounted between said head and tail plates, a crank rotatably mounted from the frame exteriorly of said head plate, motion transmitting means interconnecting the crank and line spool, the crank, motion transmitting means and line spool comprising a drive train of multiple rotatable members, said free spool mechanism comprising at least a pinion and a drive gear in said motion transmitting means, said drive gear continuously meshing with said pinion exteriorily of said head plate, said pinion having axially inner and axially outer ends, clutch means selectively interconnecting the pinion with one of the rotatable members in said drive train other than said drive gear, said clutch means having interfitting first and second clutch elements, said first clutch element mounted on the axially inner end of said pinion for rotation therewith, said second clutch element mounted for rotation with the rotatable member of the drive train selectively interconnected to said pinion by the clutch means, said pinion and first clutch element being axially translatable, shift means to effect translation of said pinion and first clutch element for engaging and disengaging said clutch elements, said shift means comprising, aa shift member movably mounted in and through said frame exteriorily of said head plate, said shift member having a knob means at one end thereof located exteriorly of said frame and having engaging means at the other end thereof for contacting said pinion, biasing means operatively mounted between said frame and said shift member by which said pinion is movable to the position in which said clutch elements are engaged, a contacting means on said shift member which engages said head plate on the frame to arrest the action of the biasing means when said clutch elements are engaged to permit rotation of said pinion free from biasing contact with said shift member, a follower on said shift member located medially the ends thereof, a ramp means on said frame being engaged by said follower to effect a compound translating and swinging movement of said engaging means upon the application of a radially inwardly displacing force to said knob means sufficient to overcome said biasing means and thereby translate said pinion to disengage said clutch elements, detent means on the axially outer end of said pinion, latch means on said frame for engaging said detent means after said pinion is translated sufficiently to disengage said clutch means, throw means associated with said detent means to disengage said latch means from said detent means upon rotation of said pinion.

* * * * *